(12) United States Patent
Zhang (10) Patent No.: US 12,539,831 B2
(45) Date of Patent: Feb. 3, 2026

(54) SUPPORT, BATTERY ASSEMBLY, ELECTRIC DEVICE, AND BATTERY SWAPPING SYSTEM

(71) Applicant: CONTEMPORARY AMPEREX TECHNOLOGY (HONG KONG) LIMITED, Hong Kong (CN)

(72) Inventor: Wenhui Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 321 days.

(21) Appl. No.: 18/208,897

(22) Filed: Jun. 13, 2023

(65) Prior Publication Data

US 2023/0322191 A1 Oct. 12, 2023

Related U.S. Application Data

(63) Continuation of application No. PCT/CN2022/098231, filed on Jun. 10, 2022.

(30) Foreign Application Priority Data

Sep. 30, 2021 (CN) .......................... 202122406386.4

(51) Int. Cl.
*B60K 1/04* (2019.01)
*B60R 16/04* (2006.01)
(Continued)

(52) U.S. Cl.
CPC ................ *B60S 5/06* (2013.01); *B60R 16/04* (2013.01); *H01M 50/244* (2021.01);
(Continued)

(58) Field of Classification Search
CPC .. B60S 5/06; B60R 16/04; B60K 1/04; B60K 2001/0455; H01M 50/249; H01M 50/244; H01M 2220/20
(Continued)

(56) References Cited

U.S. PATENT DOCUMENTS 8,560,147 B2 * 10/2013 Taylor ....................... B60L 1/14
  701/2
10,308,125 B2 * 6/2019 Ahrens ................... B60L 53/65
(Continued)

FOREIGN PATENT DOCUMENTS

| CN | 101418760 A | 4/2009 |
|---|---|---|
| CN | 105109466 A | 12/2015 |

(Continued)

OTHER PUBLICATIONS

International Search Report and Written Opinion mailed on Aug. 25, 2022, received for PCT Application PCT/CN2022/098231, filed on Jun. 10, 2022, 11 pages including English Translation.
(Continued)

*Primary Examiner* — Hau V Phan
(74) *Attorney, Agent, or Firm* — XSENSUS LLP (57) ABSTRACT

This application provides a support, a battery assembly, an electric device, and a battery swapping system, and relates to the field of batteries. The support may include a support body and a magnetic element, where the support body may be configured for mounting a battery. The magnetic element may be mounted on the support body, where the magnetic element may be configured for detection by a positioning apparatus of a battery swapping device, for positioning the support body and the battery swapping device.

12 Claims, 4 Drawing Sheets

(51) Int. Cl.
*B60S 5/06* (2019.01)
*H01M 50/244* (2021.01)
*H01M 50/249* (2021.01)
*B60L 53/80* (2019.01)

(52) U.S. Cl.
CPC ............ *H01M 50/249* (2021.01); *B60K 1/04* (2013.01); *B60K 2001/0455* (2013.01); *B60L 53/80* (2019.02); *H01M 2220/20* (2013.01)

(58) Field of Classification Search
USPC ........................................................ 180/68.5
See application file for complete search history.

(56) References Cited

U.S. PATENT DOCUMENTS

| 10,807,492 | B1* | 10/2020 | Holland | ................... B60L 53/60 |
| 11,148,644 | B2* | 10/2021 | Zhang | ................. H01M 10/425 |
| 2018/0047955 | A1* | 2/2018 | Yoon | ...................... H01M 10/42 |
| 2018/0154789 | A1* | 6/2018 | Janku | ........................ B66F 9/06 |
| 2019/0210482 | A1* | 7/2019 | Lin | ......................... B60L 53/36 |
| 2020/0164760 | A1* | 5/2020 | Sohmshetty | ............ B60L 53/80 |
| 2021/0261017 | A1* | 8/2021 | Uiterloo | .................. B60L 50/66 |

FOREIGN PATENT DOCUMENTS

| CN | 205621392 U | 10/2016 |
| CN | 106515681 A | 3/2017 |
| CN | 106740725 A | 5/2017 |
| CN | 211280706 U | 8/2020 |
| CN | 213768313 U | 7/2021 |
| CN | 213893285 U | 8/2021 |
| JP | 2016-137755 A | 8/2016 |
| WO | 2019/109996 A1 | 6/2019 |
| WO | 2020/228731 A1 | 11/2020 |

OTHER PUBLICATIONS

Extended European Search Report issued Aug. 1, 2024 in European Patent Application No. 22874277.1.

Notice of Grant of Utility Model Patent issued May 31, 2022 in Chinese Patent Application No. 202122406386.4 with machine English translation thereof.

\* cited by examiner

SUPPORT, BATTERY ASSEMBLY, ELECTRIC DEVICE, AND BATTERY SWAPPING SYSTEM

CROSS-REFERENCE TO RELATED APPLICATIONS

This application is a continuation of International Application No. PCT/CN2022/098231, filed Jun. 10, 2022, which claims priority to Chinese patent application No. 202122406386.4, filed on Sep. 30, 2021 and entitled "SUPPORT, BATTERY ASSEMBLY, ELECTRIC DEVICE, AND BATTERY SWAPPING SYSTEM", which is incorporated herein by reference in its entirety.

TECHNICAL FIELD

This application relates to the field of batteries, and specifically, to a support, a battery assembly, an electric device, and a battery swapping system.

BACKGROUND

Batteries are widely applied to the new energy field, such as electric vehicles and new energy vehicles. New energy vehicles and electric vehicles have emerged as a key trend in the evolution of the automobile industry. After running out of power, a battery of a motor-powered vehicle or new energy vehicle needs to be replaced. However, the existing battery swapping device does not support fast battery swapping.

SUMMARY

Embodiments of this application are intended to provide a support, a battery assembly, an electric device, and a battery swapping system so as to resolve the prior-art problem that a battery swapping device does not support fast battery swapping.

According to a first aspect, an embodiment of this application provides a support configured to connect to a battery and an electric device body, where the support includes a support body and a magnetic element, and the support body is configured for mounting the battery. The magnetic element is mounted on the support body, where the magnetic element is configured for detection by a positioning apparatus of a battery swapping device, for positioning the support body and the battery swapping device.

In the foregoing technical solution, the support body can be configured for mounting the battery and connecting to the electric device body. The support body is provided with the magnetic element, and the magnetic element can produce a magnetic field for detection by the positioning apparatus of the battery swapping device, for fast positioning the support body and the battery swapping device, thus facilitating fast battery swapping by the battery swapping device.

In an optional technical solution of this embodiment of this application, the support further includes a connecting element, where the connecting element is configured to connect the magnetic element and the support body. The support body is provided with a mounting hole, where the mounting hole is configured to accommodate at least part of the connecting element. A limiting structure is formed on the connecting element, where the limiting structure is configured to prevent the connecting element from leaving the mounting hole.

In the foregoing technical solution, provision of the connecting element is conducive to mounting the magnetic element onto the support body. The limiting structure is formed on the connecting element, such that the connecting element accommodated in the mounting hole cannot leave the mounting hole, increasing the reliability of connection between the magnetic element and the support body and decreasing the risk of the magnetic element leaving the support body during use of the electric device body.

In an optional technical solution of this embodiment of this application, the limiting structure includes a plurality of barbs spaced apart on the connecting element in a direction of the connecting element being inserted into the mounting hole, where the plurality of barbs are at least partly accommodated in the mounting hole.

The barbs have a property of unidirectional passability. Therefore, in the foregoing technical solution, the barbs provided on the connecting element allow the connecting element to be inserted into the mounting hole while preventing the connecting element from leaving the mounting hole. This facilitates and simplifies mounting of the connecting element and guarantees the reliability of connection between the connecting element and the support body.

In an optional technical solution of this embodiment of this application, the connecting element further includes a head portion and an extension portion, where the head portion is connected to one end of the extension portion. The extension portion is configured to be inserted into the mounting hole, and the limiting structure is provided on the extension portion. The head portion is configured to abut against the support body in the direction of the connecting element being inserted into the mounting hole, and the limiting structure is configured to prevent the extension portion from leaving the mounting hole in an opposite direction to the direction of the connecting element being inserted into the mounting hole.

In the foregoing technical solution, with the head portion and the extension portion provided and the limiting structure provided on the extension portion, when the connecting element is inserted, the head portion can abut against the support body to prevent the connecting element from being over-inserted into the support body or protruding out of the mounting hole. After the connecting element is inserted into the mounting hole or the extension portion is accommodated in the mounting hole, the limiting structure can prevent the extension portion from leaving the mounting hole in an opposite direction to the direction of the connecting element being inserted into the mounting hole. In this way, the connecting element is limited in the mounting hole so that the connecting element cannot leave the mounting hole, that is, the connecting element cannot be separated from the support body, making a firm connection between the connecting element and the support body.

In an optional technical solution of this embodiment of this application, the support body is provided with a recess, where the recess is configured to accommodate the head portion.

In the foregoing technical solution, provision of the recess for accommodating the head portion reduces the height of the head portion protruding from the support body, decreasing the risk of damaging the head portion caused by collision with other structures.

In an optional technical solution of this embodiment of this application, the connecting element includes the extension portion configured to be inserted into the mounting hole, where the extension portion includes a first arm and a second arm that are spaced apart, and both the first arm and the second arm are provided with the limiting structure.

In the foregoing technical solution, a gap is present between the first arm and the second arm. When the connecting element is inserted into the mounting hole, the first arm and the second arm are simultaneously in contact with the hole wall of the mounting hole, and the first arm and the second arm can approach each other under the action of a force to reduce the volume of the extension portion, facilitating insertion of the extension portion into the mounting hole. After the extension portion is inserted into the mounting hole, the first arm and the second arm reset due to losing the action of a force, and the limiting structures on the first arm and the second arm prevent the extension portion from leaving the mounting hole.

In an optional technical solution of this embodiment of this application, at least part of the magnetic element is buried in the connecting element.

In the foregoing technical solution, the magnetic element being buried in the connecting element brings better strength and stability of connection between the magnetic element and the connecting element, decreasing the risk of the magnetic element being separated from the connecting element.

In an optional technical solution of this embodiment of this application, the magnetic element includes a permanent magnet or an electromagnet.

In the foregoing technical solution, the permanent magnet can constantly produce a magnetic field for detection by the positioning apparatus of the battery swapping device. After energizing, the electromagnet also produces a magnetic field for detection by the positioning apparatus of the battery swapping device.

In an optional technical solution of this embodiment of this application, the support body includes a frame body and at least one connecting beam. The frame body is provided with an accommodating portion. The connecting beam is connected to the frame body, where the connecting beam separates the accommodating portion into a plurality of accommodating spaces, each of the accommodating spaces is configured to accommodate at least one battery, and each connecting beam is provided with the magnetic element.

In the foregoing technical solution, the connecting beam is provided such that the accommodating portion is separated into the plurality of accommodating spaces for accommodating the battery. In this way, the batteries can be mounted in the accommodating spaces. In addition, with the magnetic element provided on the connecting beam, the plurality of accommodating spaces can share the magnetic element provided on the connecting beam, for positioning. This helps to reduce the quantity of magnetic elements, decrease production costs, and improve positioning accuracy.

In an optional technical solution of this embodiment of this application, the magnetic element is mounted at the bottom of the connecting beam.

In the foregoing technical solution, the battery swapping device replaces the battery from the lower side of the support body. Therefore, the magnetic element being provided at the bottom of the connecting beam makes the magnetic element closer to the battery swapping device. This helps the positioning apparatus of the battery swapping device to fast detect the magnetic element so as to position the support body and the battery swapping device.

According to a second aspect, an embodiment of this application provides a battery assembly including the foregoing support and a battery, where the battery is mounted on the support.

According to a third aspect, an embodiment of this application provides an electric device including an electric device body and the foregoing battery assembly, where the support of the battery assembly is mounted on the electric device body.

According to a fourth aspect, an embodiment of this application provides a battery swapping system used to replace batteries for the foregoing electric device. The battery swapping system includes a battery swapping device, where the battery swapping device includes an execution mechanism and a positioning apparatus. The positioning apparatus is configured to perform detection for the magnetic element so as to position the battery swapping device and the support. The execution mechanism is configured to replace the battery of the electric device.

BRIEF DESCRIPTION OF DRAWINGS

In order to describe the technical solutions in the embodiments of this application more clearly, the following briefly describes the accompanying drawings required for describing the embodiments. It should be appreciated that the accompanying drawings below only show some embodiments of this application, and thus should not be considered as a limitation to the scope. A person of ordinary skill in the art may still derive other related drawings from the accompanying drawings without creative efforts.

Reference signs: 10. battery assembly; 110. battery; 120. support; 121. frame body; 1211. accommodating space; 122. connecting beam; 1221. mounting hole; 123. line-collecting beam; 124. mounting element; 125. first positioning element; 126. magnetic element; 127. connecting element; 1271. head portion; 1272. extension portion; 1272*a*. first arm; 1272*b*. second arm; 1273. limiting structure; 300. motor; 400. electric device body; 500. controller; 600. battery swapping device; 610. execution mechanism; 620. positioning apparatus; and 1000. electric device.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples that do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims, and brief description of drawings of this application are intended to cover non-exclusive inclusions.

In descriptions of embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the description of this application, "a plurality of" means at least two unless otherwise specifically stated.

In this specification, reference to "embodiment" means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the descriptions of embodiments of this application, the term "and/or" in this application describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may be a fixed connection, a detachable connection, or an integral connection, may be a mechanical connection or electrical connection, or may be a direct connection, an indirect connection via an intermediate medium, or an interaction between two elements. Persons of ordinary skill in the art can understand specific meanings of these terms in this application based on specific situations.

Batteries are widely applied to the new energy field, such as electric vehicles and new energy vehicles. New energy vehicles and electric vehicles have emerged as a key trend in the evolution of the automobile industry. After running out of power, a battery of a motor-powered vehicle or new energy vehicle needs to be replaced. However, the existing battery swapping device does not support fast battery swapping.

The applicant has noted that before battery swapping by the existing battery swapping device, users need to park their vehicles at preset positions, and then the battery swapping device swaps batteries for the vehicles. However, users often have difficulties in parking their vehicles at the exact positions, resulting in the battery swapping device spending a long time in locating positions of the vehicles and the battery swapping device before swapping batteries for the vehicles. In addition, the vehicles cannot be adjusted in their positions when breaking down or having exhausted batteries, such that they cannot be parked at the preset positions. In this case, the battery swapping device also needs a long time to locate the relative positions of the vehicles and the battery swapping device. However, the battery swapping device can swap batteries only after the relative positions of the vehicles and the battery swapping devices are accurately located.

To resolve the problem that the battery swapping device spends a long time locating relative positions of vehicles and the battery swapping device, the applicant has found through research that with a magnetic element mounted on the battery mounting support of the vehicles and a positioning apparatus provided on the battery swapping device, the positioning apparatus of the battery swapping device can perform detection for the magnetic element to fast position the support and the battery swapping device.

Based on the foregoing considerations and through in-depth research, the applicant has designed a support including a support body and a magnetic element, where the support body is configured for mounting a battery. The magnetic element is mounted on the support body, where the magnetic element is configured for detection by a positioning apparatus of a battery swapping device, for positioning the support body and the battery swapping device. The support body of the support can be configured for mounting the battery and connecting to the electric device body. The support body is provided with the magnetic element, and the magnetic element can produce a magnetic field for detection by the positioning apparatus of the battery swapping device, for fast positioning the support body and the battery swapping device, thus facilitating fast battery swapping by the battery swapping device.

An embodiment of this application provides an electric device that uses a battery as the power supply. The electric device may be but is not limited to an electric bicycle, an electric vehicle, a ship, or a spacecraft. The spacecraft may include airplanes, rockets, space shuttles, and spaceships.

For ease of description, the electric device 1000 in an embodiment of the application being a vehicle is used as an example for description of the following embodiments.

Figure 1:
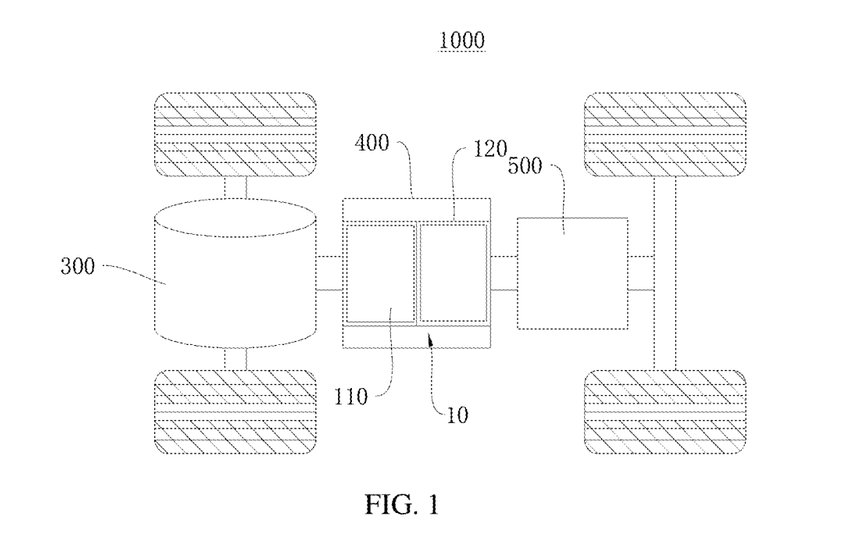
FIG. 1 is a schematic structural diagram of a vehicle according to some embodiments of this application.
Figure 2:
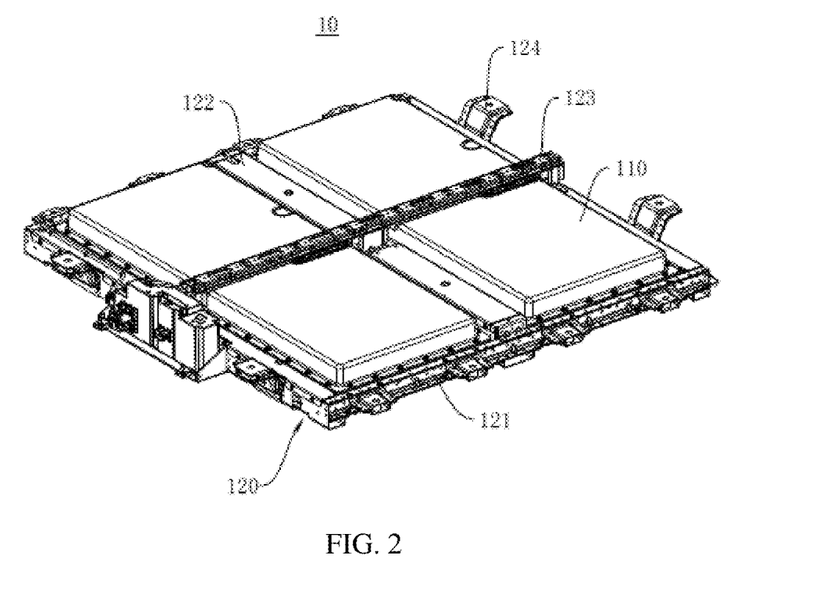
FIG. 2 is a schematic structural diagram of a battery assembly according to some embodiments of this application.
Figure 3:
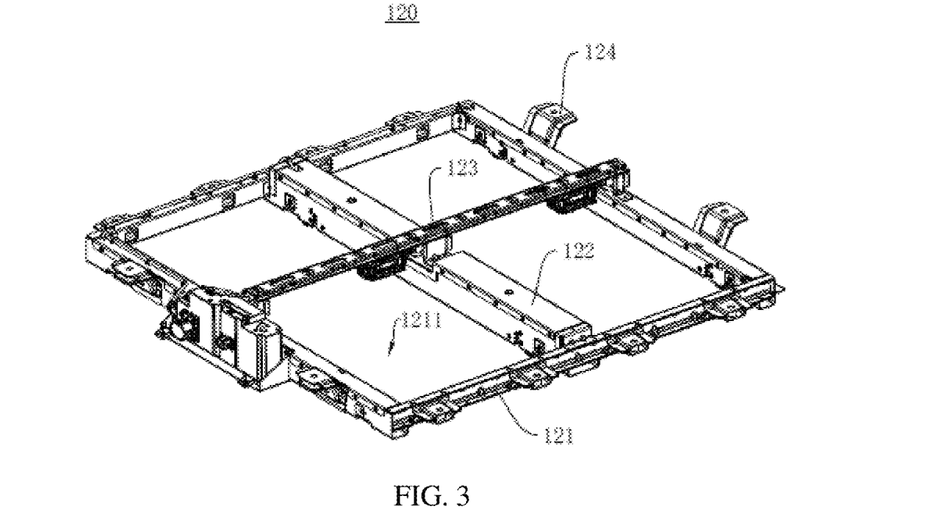
FIG. 3 is a schematic diagram of an overall structure of a support according to some embodiments of this application.
Figure 4:
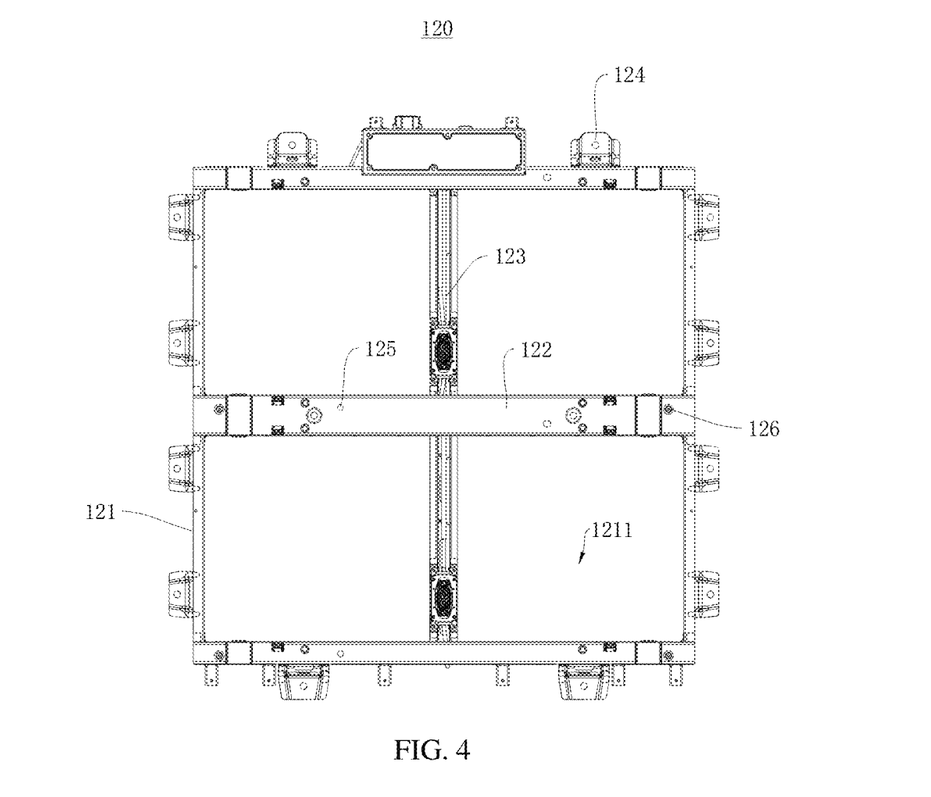
FIG. 4 is a schematic structural diagram of a support in a first perspective according to some embodiments of this application.

Refer to FIG. 1, with reference to FIG. 2, FIG. 3, and FIG. 4. FIG. 1 is a schematic structural diagram of an electric device 1000 according to some embodiments of this application. FIG. 2 is a schematic structural diagram of a battery assembly 10 according to some embodiments of this application. FIG. 3 is a schematic diagram of an overall structure of a support 120 according to some embodiments of this application. FIG. 4 is a schematic structural diagram of a support 120 in a first perspective according to some embodiments of this application. The electric device 1000 includes an electric device body 400 and the battery assembly 10, where the battery assembly 10 includes the support 120 and a battery 110. The support 120 is mounted on the electric device body 400, and the battery 110 is mounted on the support 120. The support 120 of the battery assembly 10 is mounted on the electric device body 400. In other words, the battery 110 and the electric device body 400 are connected via the support 120. The support 120 can provide an accommodating space 1211 for the battery 110, facilitating replacement of the battery 110.

The electric device 1000 may be a fossil fuel vehicle, a natural-gas vehicle, or a new energy vehicle, where the new energy vehicle may be a battery electric vehicle, a hybrid electric vehicle, a range-extended vehicle, or the like. The battery 110 is provided inside the electric device 1000, and the battery 110 may be provided at the bottom, front, or rear of the electric device 1000. The battery 110 may be configured to supply power to the electric device 1000. For example, the battery 110 may be used as an operational power source for the electric device 1000. The electric device 1000 may further include a motor 300 and a controller 500, where the controller 500 is configured to control the battery 110 to supply power to the motor 300, for example, to satisfy the power needs of start, navigation, and driving of the electric device 1000.

In some embodiments of this application, the battery 110 can be used as not only the operational power source for the electric device 1000 but also a driving power source for the electric device 1000, replacing or partially replacing fossil fuel or natural gas to provide driving traction for the electric device 1000.

Refer to FIG. 2, FIG. 3, and FIG. 4. An embodiment of this application provides a support 120 configured to connect to a battery 110 and an electric device body 400, where the support 120 includes a support body and a magnetic element 126, and the support body is configured for mounting the battery 110. The magnetic element 126 is mounted on the support body, where the magnetic element 126 is configured for detection by a positioning apparatus 620 of a battery swapping device 600, for positioning the support body and the battery swapping device 600.

The magnetic element 126 is a substance or structure having magnetism. The magnetic element 126 includes a permanent magnet or an electromagnet and also includes a structure magnetized (magnetization means a process making an originally non-magnetic metal magnetic under the action of a magnetic substance).

The permanent magnet can constantly produce a magnetic field for detection by the positioning apparatus 620 of the battery swapping device 600. After energizing, the electromagnet also produces a magnetic field for detection by the positioning apparatus 620 of the battery swapping device 600. A permanent magnet and an electromagnet are not apt to lose magnetism and thus have better effects.

The support body of the support 120 provided in the embodiment of this application can be configured for mounting the battery 110 and connecting to the electric device body 400. The support body is provided with the magnetic element 126, and the magnetic element 126 can produce a magnetic field for detection by the positioning apparatus 620 of the battery swapping device 600, for fast positioning the support body and the battery swapping device 600, thus facilitating fast battery swapping by the battery swapping device 600.

Refer to FIG. 3. In some embodiments of this application, the support body includes a frame body 121 and at least one connecting beam 122. The frame body 121 is provided with an accommodating portion. The connecting beam 122 is connected to the frame body 121, where the connecting beam 122 separates the accommodating portion into a plurality of accommodating spaces 1211, each of the accommodating spaces is configured to accommodate at least one battery 110, and each connecting beam 122 is provided with the magnetic element 126.

The frame body 121 is a middle hollow frame structure or ring structure formed by jointing a plurality of beams end to end. As a load-bearing component of the whole support 120, the frame body 121 is configured to bear the weight of the battery 110 to support and limit the battery 110. The accommodating portion is the foregoing middle hollow region, where the battery 110 can be accommodated in the accommodating portion and fixed to the frame body 121.

The connecting beam 122 is connected to the frame body 121. Specifically, the connecting beam 122 is located in the accommodating portion, with two ends of the connecting beam 122 connected to the frame body 121. Refer to FIG. 3. One connecting beam 122 in FIG. 3 separates the accommodating portion into two accommodating spaces 1211. Each accommodating space 1211 is configured to accommodate one or more batteries 110. Certainly, if the support body includes a plurality of connecting beams 122, the plurality of connecting beams 122 can separate the accommodating portion into a plurality of accommodating spaces 1211 for mounting a plurality of batteries 110.

In some embodiments of this application, the connecting beam 122 is provided with a locking mechanism for locking the battery 110. Each connecting beam 122 is provided with the magnetic element 126, and the magnetic element 126 can produce a magnetic field by detection by the positioning apparatus 620 of the battery swapping device 600, for fast positioning the support 120 and the battery swapping device 600. After being positioned, the battery swapping device 600 can unlock the locking mechanism provided on the connecting beam 122 to unlock and replace the battery 110.

The connecting beam 122 is provided such that the accommodating portion is separated into the plurality of accommodating spaces 1211 for accommodating the battery 110. In this way, the batteries 110 can be mounted in the accommodating spaces 1211. In addition, with the magnetic element 126 provided on the connecting beam 122, the plurality of accommodating spaces 1211 can share the magnetic element 126 mounted on the connecting beam 122, for positioning. This helps to reduce the quantity of magnetic elements 126, decrease production costs, and improve positioning accuracy.

Refer to FIG. 3. In some embodiments of this application, the support body includes a line-collecting beam 123, where the line-collecting beam 123 is provided vertically with the connecting beam 122. Two ends of the line-collecting beam 123 are connected to the frame body 121, and a line passage is formed on the line-collecting beam 123 for integrating connecting lines. The connecting lines connect the plurality of batteries 110 located in the accommodating space 1211 in series or in parallel and finally supply power to the electric device 1000. Refer to FIG. 3. The frame body 121, the line-collecting beam 123, and the connecting beam 122 form a structure that resembles a square divided into four smaller squares, and the empty regions in the structure are used for mounting the batteries 110. Provision of the line-collecting beam 123 can reinforce strength of the support 120 and collect the lines to make the plurality of batteries 110 be connected in series or in parallel, so as to supply power to the electric device 1000.

Refer to FIG. 3. In some embodiments of this application, a mounting element 124 is formed outside the frame body 121, where the mounting element 124 is configured to be connected to the electric device body 400 so as to fasten the support 120 to the electric device 1000. Optionally, a plurality of mounting elements 124 are formed outside the frame body 121, where the plurality of mounting elements 124 are spaced apart outside the frame body 121. Refer to FIG. 3. In some embodiments of this application, four mounting elements 124 are formed outside the frame body 121, where two of the mounting elements are connected to a first side of the frame body 121, and the other two are connected to a second side of the frame body 121, the first side being opposite to the second side.

Refer to FIG. 4. In some embodiments of this application, the support body is further provided with a first positioning element 125, where the first positioning element 125 is configured to cooperate with a second positioning element on the battery swapping device 600 to accurately position the support 120 and the battery swapping device 600. For example, the first positioning element 125 is a positioning pin protruding from the support body, and the second positioning element is a positioning hole recessed on the battery swapping device 600. For another example, the first positioning element 125 is a positioning hole provided on the support body, and the second positioning element is a positioning pin protruding from the battery swapping device 600.

Figure 5:
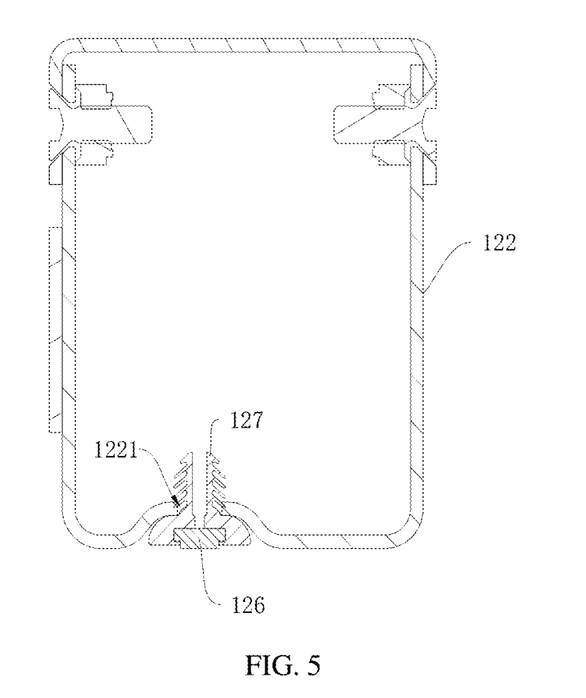
FIG. 5 is a schematic diagram of connection between a magnetic element and a support body according to some embodiments of this application.

Refer to FIG. 4 and FIG. 5. FIG. 5 is a schematic diagram of connection between the magnetic element 126 and the support body according to some embodiments of this application. In some embodiments of this application, the magnetic element 126 is mounted at the bottom of the connecting beam 122.

The "bottom of the connecting beam 122" is a side of the connecting beam 122 close to the battery 110 being inserted into the support 120. Taking a vehicle as an example, the battery 110 is upward inserted into the support 120 from the bottom of the vehicle. Therefore, the bottom of the connecting beam 122 is a side of the connecting beam 122 close to the bottom of the vehicle.

The battery swapping device 600 replaces the battery below the support 120. Therefore, the magnetic element 126 being provided at the bottom of the connecting beam 122 makes the magnetic element 126 closer to the battery swapping device 600. This helps the positioning apparatus 620 of the battery swapping device 600 to fast detect the magnetic element 126 so as to position the support 120 and the battery swapping device 600.

Figure 6:
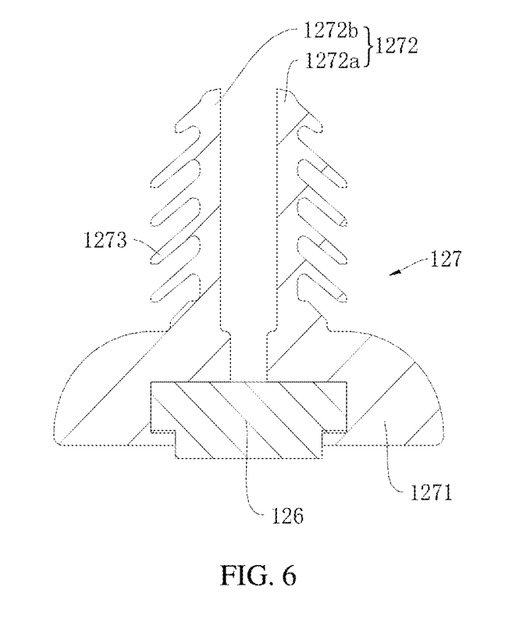
FIG. 6 is a schematic diagram of connection between a magnetic element and a connecting element according to some embodiments of this application.

Refer to FIG. 5 and FIG. 6. FIG. 6 is a schematic diagram of connection between the magnetic element 126 and a connecting element 127 according to some embodiments of this application. In some embodiments of this application, the support 120 further includes the connecting element 127, where the connecting element 127 is configured to connect the magnetic element 126 and the support body. The support body is provided with the mounting hole 1221, where the mounting hole 1221 is configured to accommodate at least part of the connecting element 127. A limiting structure 1273 is formed on the connecting element 127, where the limiting structure 1273 is configured to prevent the connecting element 127 from leaving the mounting hole 1221.

"The mounting hole 1221 being configured to accommodate at least part of the connecting element 127" means that the mounting hole 1221 can accommodate part or all of the connecting element 127. Refer to FIG. 5. FIG. 5 shows the case that the mounting hole 1221 accommodates part of the connecting element 127. When the mounting hole 1221 has enough depth, the mounting hole 1221 can accommodate all of the connecting element 127.

The limiting structure 1273 is a structure configured to prevent the connecting element 127 from leaving the mounting hole 1221, decreasing the risk of the connecting element 127 leaving the mounting hole 1221.

Provision of the connecting element 127 is conducive to mounting the magnetic element 126 on the support body. The limiting structure 1273 is formed on the connecting element 127 such that the connecting element 127 accommodated in the mounting hole 1221 cannot leave the mounting hole 1221, increasing the reliability of connection between the magnetic element 126 and the support body and decreasing the risk of the magnetic element 126 being separated from the support body during use of the electric device body 400.

Refer to FIG. 6. In some embodiments of this application, the limiting structure 1273 includes a plurality of barbs spaced apart on the connecting element 127 in a direction of the connecting element 127 being inserted into the mounting hole 1221, where the plurality of barbs are at least partly accommodated in the mounting hole 1221.

The barb is a strip-shaped structure or a needle-shaped structure, where a first end of the barb is connected to the connecting element 127, and a gap is present between a second end of the barb and the connecting element 127. When the connecting element 127 moves in the direction of the connecting element 127 being inserted into the mounting hole 1221, the second end of the barb is forced to approach the connecting element 127, thereby allowing the connecting element 127 to move in the direction of the connecting element 127 being inserted into the mounting hole 1221. When the connecting element 127 moves in the opposite direction to the direction of the connecting element 127 being inserted into the mounting hole 1221, the second end of the barb abuts on the hole wall of the mounting hole 1221 or the support body to prevent the connecting element 127 from moving in the opposite direction to the direction of the connecting element 127 being inserted into the mounting hole 1221.

The barbs have a property of unidirectional passability. Therefore, the barbs provided on the connecting element 127 allow the connecting element 127 to be inserted into the mounting hole 1221 while preventing the connecting element 127 from leaving the mounting hole 1221. This facilitates and simplifies mounting of the connecting element 127 and guarantees the reliability of connection between the connecting element 127 and the support 120 body.

In some other embodiments of this application, the limiting structure 1273 is an elastic portion and an abutting portion, where the abutting portion is connected to one side of the connecting element 127 through the elastic portion. When the connecting element 127 is inserted into the mounting hole 1221, the abutting portion is pressed such that the elastic portion is compressed and the abutting portion approaches the connecting element 127, facilitating insertion into the mounting hole 1221. After the connecting element 127 is inserted into the mounting hole 1221, the elastic portion resets such that the abutting portion moves away from the connecting element 127. In this way, when the connecting element 127 moves in the opposite direction to the direction of the connecting element 127 being inserted into the mounting hole 1221, the abutting portion abuts on the hole wall of the mounting hole 1221 or the support body to prevent the connecting element 127 from moving in the opposite direction to the direction of the connecting element 127 being inserted into the mounting hole 1221.

Refer to FIG. 6. In some embodiments of this application, the connecting element 127 further includes a head portion 1271 and an extension portion 1272, where the head portion 1271 is connected to one end of the extension portion 1272. The extension portion 1272 is configured to be inserted into the mounting hole 1221, and the limiting structure 1273 is provided on the extension portion 1272. The head portion 1271 is configured to abut against the support 120 body in the direction of the connecting element 127 being inserted into the mounting hole 1221, and the limiting structure 1273 is configured to prevent the extension portion 1272 from leaving the mounting hole 1221 in an opposite direction to the direction of the connecting element 127 being inserted into the mounting hole 1221.

Optionally, the head portion 1271 is of a flat disk shape, and the diameter of the head portion 1271 is greater than that of the mounting hole 1221. In the process of inserting the connecting element 127 into the mounting hole 1221, if the extension portion 1272 is inserted to a preset position in the mounting hole 1221, the head portion 1271 abuts on the support body to prevent the extension portion 1272 from continuing to move in the mounting hole 1221.

In some other embodiments of this application, the head portion 1271 is a square plate, and the length of sides of the head portion 1271 is greater than the diameter of the mounting hole 1221, also achieving an abutting-on effect. The head portion 1271 is not limited to a specified shape in this application, provided that the head portion can abut against the support body in the direction of the connecting element 127 being inserted into the mounting hole 1221.

With the head portion 1271 and the extension portion 1272 provided and the limiting structure 1273 provided on the extension portion 1272, when the connecting element 127 is inserted, the head portion 1271 can abut against the support body to prevent the connecting element 127 from being over-inserted into the support body or protruding out of the mounting hole 1221. After the connecting element 127 is inserted into the mounting hole 1221, in other words, after the extension portion 1272 is accommodated in the mounting hole 1221, the limiting structure 1273 can prevent the extension portion 1272 from leaving the mounting hole 1221 in an opposite direction to the direction of the connecting element 127 being inserted into the mounting hole 1221. In this way, the connecting element 127 is limited in the mounting hole 1221 such that the connecting element 127 cannot leave the mounting hole 1221 or the support 120 body, making a firm connection between the connecting element 127 and the support body.

Refer to FIG. 5. In some embodiments of this application, the support body is provided with a recess, where the recess is configured for accommodating the head portion 1271.

Providing the recess for accommodating the head portion 1271 reduces the height of the head portion 1271 protruding from the support body, decreasing the risk of head portion 1271 being damaged due to collision with other structures.

Refer to FIG. 6. In some embodiments of this application, the extension portion 1272 includes a first arm 1272a and a second arm 1272b that are spaced apart, where the first arm 1272a and the second arm 1272b are both provided with the limiting structure 1273.

The first arm 1272a is a strip-shaped structure extending in the direction of the connecting element 127 being inserted into the mounting hole 1221. The limiting structure 1273 is provided on a side of the first arm 1272a farther away from the second arm 1272b. The second arm 1272b is a strip-shaped structure extending in the direction of the connecting element 127 being inserted into the mounting hole 1221. The limiting structure 1273 is provided on a side of the second arm 1272b farther away from the first arm 1272a. The first arm 1272a and the second arm 1272b are disposed opposite each other, with a space or gap between them. The first arm 1272a and the second arm 1272b may slightly deform when bearing a force such that the first arm 1272a and the second arm 1272b approach each other.

A gap is present between the first arm 1272a and the second arm 1272b. When the connecting element 127 is inserted into the mounting hole 1221, the first arm 1272a and the second arm 1272b are simultaneously in contact with the hole wall of the mounting hole 1221, and the first arm 1272a and the second arm 1272b can approach each other under the action of a force to reduce the volume of the extension portion 1272, facilitating insertion of the extension portion 1272 into the mounting hole 1221. After the extension portion 1272 is inserted into the mounting hole 1221, the first arm 1272a and the second arm 1272b reset due to losing the action of a force, and the limiting structures 1273 on the first arm 1272a and the second arm 1272b prevent the extension portion 1272 from leaving the mounting hole 1221.

Refer to FIG. 5. In some embodiments of this application, at least part of the magnetic element 126 is buried in the connecting element 127.

The magnetic element 126 being buried in the connecting element 127 means that the magnetic element 126 is pre-buried in the connecting element 127 or is subsequently buried at the connecting element 127 by other means.

Preferably, in some embodiments of this application, the magnetic element 126 is partly buried at the head portion 1271 of the connecting element 127. In other words, the magnetic element 126 partly protrudes from the head portion 1271 of the connecting element 127.

The magnetic element 126 being buried at the connecting element 127 brings better strength and stability of connection between the magnetic element 126 and the connecting element 127, decreasing the risk of the magnetic element 126 leaving the connecting element 127.

Figure 7:
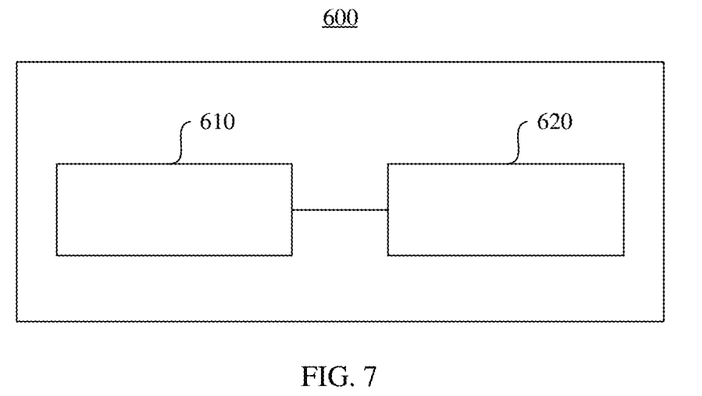
FIG. 7 is a schematic structural diagram of a battery swapping system according to some embodiments of this application.

Refer to FIG. 7. FIG. 7 is a schematic structural diagram of a battery swapping system according to some embodiments of this application. The embodiment of this application provides a battery swapping system used to swap batteries for the foregoing electric device 1000. The battery swapping system includes the battery swapping device 600, where the battery swapping device 600 includes an execution mechanism 610 and a positioning apparatus 620, where the positioning apparatus 620 is configured to perform detection for the magnetic element 126 so as to position the battery swapping device 600 and the support 120. The execution mechanism 610 is configured to replace the battery 110 of the electric device 1000.

Optionally, the execution mechanism 610 is provided with a second positioning element, where the second positioning element is configured to cooperate with the first positioning element 125 provided on the support body, for positioning.

The foregoing descriptions are merely preferred embodiments of this application which are not intended to limit this application. Persons skilled in the art understand that this application may have various modifications and variations. Any modification, equivalent replacement, and improvement made without departing from the spirit and principle of this application shall fall within the protection scope of this application.

The invention claimed is:

1. A support configured to connect to a battery and an electric device body, wherein the support comprises:
   a support body configured to mount the battery;
   a magnetic structure mounted on the support body, wherein the magnetic structure is configured for detection by a positioning structure of a battery swapping device, for positioning the support body and the battery swapping device; and
   a connecting structure configured to connect the magnetic structure and the support body: wherein
   the support body is provided with a mounting hole, wherein the mounting hole is configured to accommodate at least a part of the connecting structure; and
   a limiting structure is formed on the connecting structure, wherein the limiting structure is configured to prevent the connecting structure from leaving the mounting hole.

2. The support according to claim 1, wherein the limiting structure comprises a plurality of barbs spaced apart on the connecting structure in a direction of the connecting structure being inserted into the mounting hole, wherein the plurality of barbs are at least partly accommodated in the mounting hole.

3. The support according to claim 2, wherein the connecting structure comprises the extension portion configured to be inserted into the mounting hole, the extension portion comprises a first arm and a second arm that are spaced apart, and both the first arm and the second arm are provided with the limiting structure.

4. The support according to claim 1, wherein the connecting structure further comprises a head portion and an extension portion, wherein the head portion is connected to one end of the extension portion, the extension portion is configured to be inserted into the mounting hole, the limiting structure is provided on the extension portion, the head portion is configured to abut against the support body in the direction of the connecting structure being inserted into the mounting hole, and the limiting structure is configured to prevent the extension portion from leaving the mounting hole in an opposite direction to the direction of the connecting structure being inserted into the mounting hole.

5. The support according to claim 4, wherein the support body is provided with a recess, and the recess is configured to accommodate the head portion.

6. The support according to claim 1, wherein at least part of the magnetic structure is buried in the connecting structure.

7. The support according to claim 1, wherein the magnetic structure comprises a permanent magnet or an electromagnet.

8. The support according to claim 1 wherein the support body comprises:
   a frame body having an accommodating portion; and
   at least one connecting beam, wherein the connecting beam is connected to the frame body, the connecting beam separates the accommodating portion into a plurality of accommodating spaces, each of the accommodating space is configured to accommodate at least one battery, and each connecting beam is provided with the magnetic structure.

9. The support according to claim 8, wherein the magnetic structure is mounted at the bottom of the connecting beam.

10. A battery assembly, wherein the battery assembly comprises:
    the support according to claim 1; and
    the battery mounted on the support.

11. An electric device, wherein the electric device comprises:
    an electric device body; and
    the battery assembly according to claim 10, wherein the support of the battery assembly is mounted on the electric device body.

12. A battery swapping system used to swap batteries for the electric device according to claim 11, wherein the battery swapping system comprises:
    a battery swapping device comprising an execution structure and the positioning structure, wherein the positioning structure is configured to perform the detection for the magnetic structure so as to position the battery swapping device and the support, and the execution structure is configured to replace the battery of the electric device.

* * * * *